Figure 1:
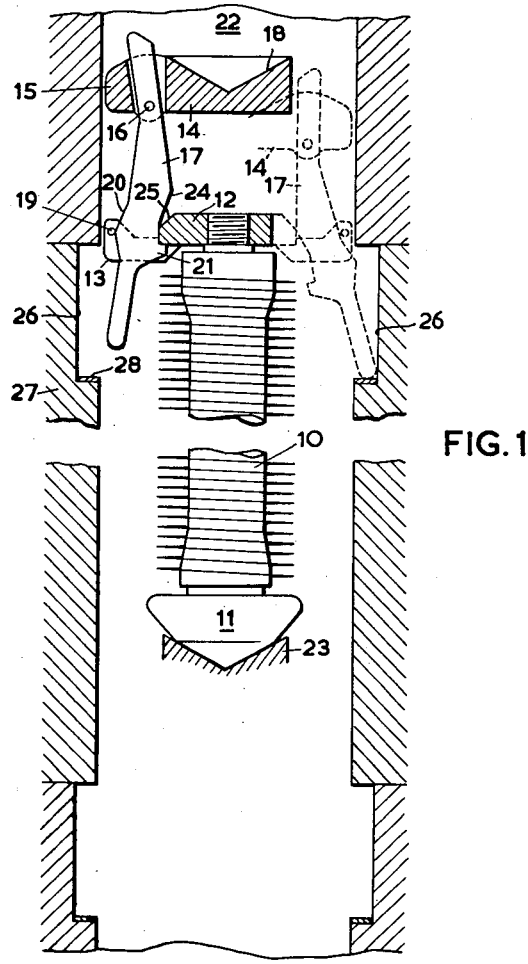

May 9, 1961
A. SHILLITTO ET AL
2,983,662
FUEL ELEMENTS FOR NUCLEAR REACTORS AND IN
NUCLEAR REACTORS USING SUCH ELEMENTS
Filed May 31, 1957
2 Sheets-Sheet 2
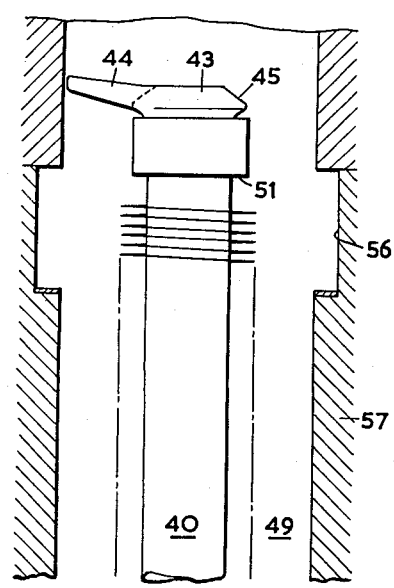
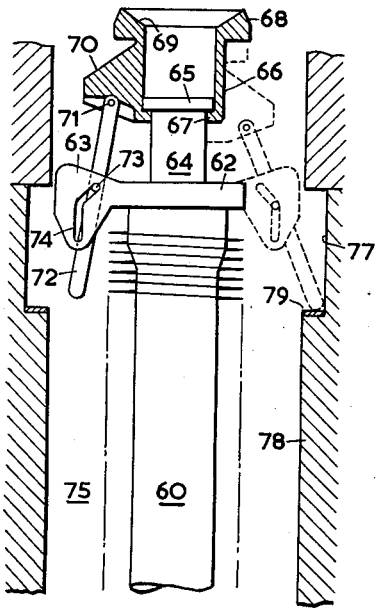
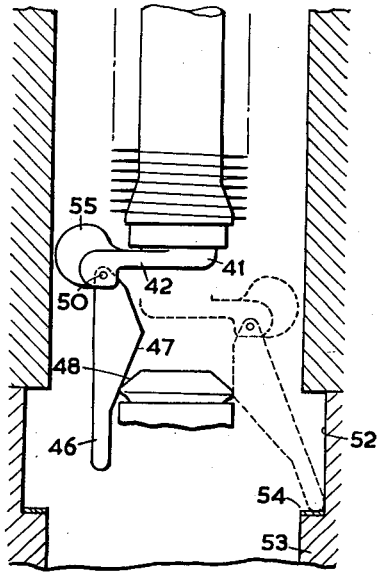
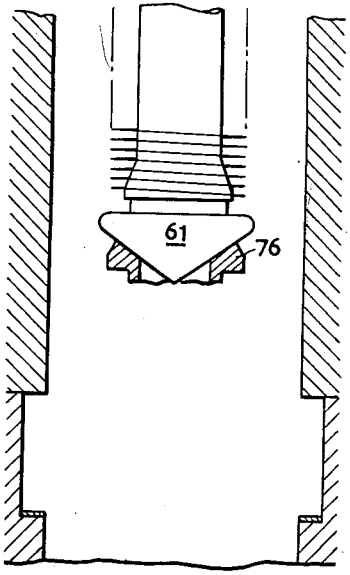
FIG.3
FIG.4
Inventors:
Arthur Shillitto
Terence Ingham
Douglas Frank Seymour
By: Stevens, Davis, Miller & Mosher
Attorneys

United States Patent Office 2,983,662
Patented May 9, 1961

2,983,662

FUEL ELEMENTS FOR NUCLEAR REACTORS AND IN NUCLEAR REACTORS USING SUCH ELEMENTS

Arthur Shillitto, Terence Ingham, and Douglas Frank Seymour, Whetstone, near Leicester, England, assignors to The English Electric Company Limited, London, England, a British company Filed May 31, 1957, Ser. No. 662,684

Claims priority, application Great Britain June 15, 1956

4 Claims. (Cl. 204—193.2)

This invention relates to a nuclear reactor, more particularly to fuel elements for use in a nuclear reactor of the kind in which the elements are positioned one above the other in vertically extending fuel channels. By a fuel element is meant a mass of fissionable material, which may be either solid or liquid in form, contained in a sheath or can.

According to the invention a fuel element for use in such a reactor is provided with a plurality of struts arranged for movement between a retracted position, where they allow free movement of the element within the fuel channel, and an extended position, where they engage supporting ledge or abutment means in the fuel channel so as to provide an independent support either for the element itself or for the next element to be lowered into the fuel channel, said struts being arranged to be automatically moved to the extended position by relative movement of the struts and guide means as they approach said supporting ledge or abutment means.

In one arrangement according to the invention, the struts are mounted on a captive member which is captively secured to the upper end of the element for limited axial movement relative to the element, said guide means being on the element itself and arranged so that when the element is suspended from a grab head via the captive member they maintain the struts in the retracted position, whereas when the element is lowered on to a support in the fuel channel continued downward movement of the captive member relative to the element causes the guide means to move the struts to the extended position where they engage said supporting ledge or abutment means and hold the captive member in a position such that it provides an independent support for the next element to be lowered into the fuel channel.

In another arrangement according to the invention the struts are pivotally mounted on the lower end of the element and are biased to the retracted position, said guide means being separately mounted in the fuel channel and arranged to cause said struts to move automatically from the retracted to the extended position as they approach said support ledge or abutment means whereby said struts provide an independent support for the element itself.

Figure 2:
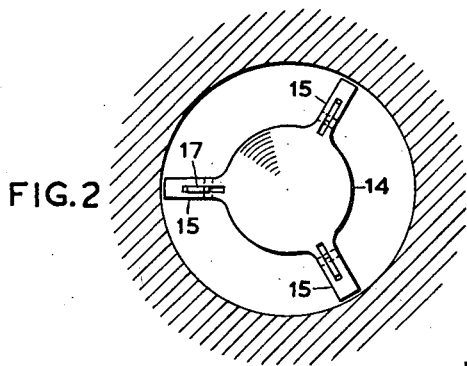

Further features of the invention as applied to a graphite moderated reactor will appear from the following description with reference to the accompanying drawings where Figs. 1 and 2 show respectively a sectional elevation and a plan view of one arrangement according to the invention, whilst Figs. 3 and 4 are similar sectional elevations of two alternative arrangements according to the invention.

Referring now to Figs. 1 and 2, a fuel element can 10, containing a mass of fissionable material, has a conical end plug 11 at its lower end and a spider 12 at its upper end having three radially projecting, equally spaced, slotted lugs 13. Captively secured to the upper end of the can is a further spider 14 having three radially projecting, equally spaced, slotted lugs 15 and on each of these lugs there is pivoted, by means of a pivot pin 16, a support strut 17. The upper face of the spider 14 has a conical depression 18 formed therein.

Each strut 17 is arranged to slide in the slot of the corresponding lug 13 on the spider 12 and is shaped so that, with the can supported from a grab head having claws which engage underneath the spider 14, a pin 19 near the outer end of the lug 13 engages a cam face 20 on the strut whereby to maintain the strut in a position such that a claw 21 on the strut engages underneath the spider 12. Under these conditions, the support struts lie in a retracted position within a circle bounded by the lugs 13.

The can, supported from the grab head in this way, is lowered into the fuel channel 22 in the reactor core until the lower end plug 11 engages a seating 23 which in the case of the first can to be lowered into the channel may form part of a shock absorbing device at the bottom of the channel, and in the case of the remaining cans will consist of the captive spider of the previously inserted can.

From the foregoing it will be clear that when the lower end plug 11 engages the seating 23, the weight of the can will be taken off the support struts 17. Continued downward movement of the captive spider 14 will then result in each of the support struts 17 being automatically moved outwards about their respective pivot pins—by reason of a further cam face 24 on the strut engaging a conical surface 25 on the spider 12—to the extended position shown dotted.

In this position the struts enter an annular recess 26 formed in the top of the graphite core block 27 and rest upon a ring 28 at the bottom of the recess, thus providing an independent support for the next can to be lowered into the fuel channel.

The lugs 13 on the spider 12 serve the additional purpose of centering the upper end of the can in the channel, whilst the lugs 15 on the spider 14 serve the additional purpose of centering the spider, and thus the next upper can, in the fuel channel.

Referring now to Fig. 3, the fuel element can, generally indicated at 40, has a support spider 41 at its lower end having three radially projecting, equally spaced, lugs 42, and a locating spider 43 at its upper end having three radially projecting, equally spaced, lugs 44. The cross section of this spider is such that an annular tapered surface 45 is formed between the lugs.

Pivotally mounted on each of the lugs 42 of the support spider 41 is a support strut 46 which has a cam face 47 formed integral therewith. The support struts are spring-biased to the retracted position shown and the cam faces, as will be explained later, co-operate with a tapered member 48 which, as in the previously described arrangement, may either be part of a shock absorbing device or the previously inserted can. The pivot pins for the support struts are indicated at 50.

The can 40 is lowered into the fuel channel 49 by means of a grab head having claws which engage underneath a flange 51 at the upper end of the can until the cam faces 47 on the support struts 46 engage the tapered member 48 whereupon the struts are pivoted outwardly about the pivot pins 50 to the extended position shown dotted, in which position each strut enters an annular recess 52 in the top of the graphite core block 53 and rests upon a ring 54 at the bottom of the recess.

The can is thus now directly supported in the fuel channel through the support struts 46, the lower end being maintained centrally within the channel by extensions 55 of the lugs 42 and the upper end being maintained centrally by means of the lugs 44 on the spider 43.

The next can is then lowered into the fuel channel and its support struts are automatically swung outwardly into a similar annular recess 56 in the top of the graphite core block 57 when the cam faces on the support struts engage the tapered surface 45 of the spider 43. Thus each can is independently supported in the fuel channel.

Referring now to Fig. 4, the can, generally indicated at 60, has a conical end plug 61 at its lower end and a spider 62 at its upper end having three radially projecting, equally spaced, slotted lugs 63. A retaining member 64, having a flange 65, is screwed on to an extension of the spider 62 and captively retains a further spider 66 having an inwardly projecting flange 67 at its lower end and an outwardly projecting flange 68 at its upper end. The upper surface of this spider has a conical depression 69 formed therein.

The spider 66 has three radially projecting, equally spaced, slotted lugs 70 and pivotally mounted on each of these lugs by means of a pivot pin 71 is a support strut 72. The slotted lugs 63 on the spider 62 serve as guides for the support struts, the radial movement of each strut being controlled by a pin 73 fixed to the strut and arranged to slide in a cranked slot 74 in the lug. With the can supported from a grab head having claws which engage underneath the flange 68 on the spider 66, the support struts will be in the retracted position shown in the drawing, the weight of the can being transmitted to the grab head via the flanges 65 and 67 on the retaining member 64 and the spider 66.

The can, supported from the grab head in this way, is lowered into the fuel channel 75 until the lower end plug 61 engages a seating 76 which, as in the previously described arrangements, may either be part of a shock absorbing device or the previously inserted can. When the end plug engages this seating, the weight of the can will be taken off the spider 66 and continued downward movement of the spider will then result in each of the support struts 72 being automatically moved outwards, due to the pin 73 sliding in the cranked slot 74, to the extended position shown dotted. In this position the struts enter an annular recess 77 in the top of the graphite core block 78 and rest upon a ring 79 at the bottom of the recess, thus providing an independent support for the next can to be inserted in the fuel channel.

In order to keep to a minimum the number of differently shaped graphite blocks making up the core of the reactor, the vertical pitch of the support struts is preferably made equal to the vertical pitch of the graphite blocks. In such an arrangement the annular recess will always be in the same place for each block.

It will be noted that in the arrangement shown in Fig. 3, each can is supported on its own support struts, whereas in the other two arrangements each can incorporates the support struts for the next upper can.

The materials used for the support structures must, of course, be compatible with other materials in the reactor and have the required nuclear and mechanical properties.

What we claim as our invention and desire to secure by Letters Patent is:

1. A fuel element assembly for a nuclear reactor having a plurality of vertical fuel element channels and including a plurality of fuel elements in each of said channels arranged one above the other, said fuel element channels having portions of enlarged diameter arranged at intervals, ledges formed at the lower ends of said portions of enlarged diameter, and radially movable strut means on said fuel elements movable from a retracted position to an extended position where said strut means engage an adjacent supporting ledge to provide an independent support for each of said fuel elements, guide means mounted on said fuel elements to move said strut means to said extended position as said strut means approach said adjacent supporting ledge, said strut means being mounted on a captive member which is secured to the upper end of each of said fuel elements for limited axial movement relative to said fuel element, said guide means being mounted on said fuel element, said guide means moving said strut means to a retracted position against said fuel element when said captive member is moved upwardly from said fuel element, and, when said fuel element is lowered onto a support in said fuel channel whereby said captive member is moved downwardly relative to said fuel element, said guide means moving said strut means to said extended position where said strut means engage said adjacent supporting ledge and hold said captive member in a position such that said captive member provides an independent support for the next fuel element to be lowered into said fuel channel.

2. The invention according to claim 1, wherein said captive member is secured to said fuel element through said strut means, each of said strut means being shaped to cooperate with said guide means on said element so that downward and upward movement of said captive member relative to said fuel element causes the lower end of said strut means to move radially outward and inward, respectively.

3. The invention according to claim 1, wherein said guide means comprise a slotted member mounted on each of said fuel elements for each of said strut means, each strut being provided with a follower means which engages a slot in said slotted member so shaped that downward and upward movement of said captive member relative to said fuel element causes the lower end of said strut to move radially outward and inward, respectively.

4. The invention according to claim 1, wherein said guide means centralize the upper end of each of said fuel elements in said fuel channel.

References Cited in the file of this patent
UNITED STATES PATENTS

| | | |
|---|---|---|
| 1,526,274 | Fitzsimons et al. | Feb. 10, 1925 |
| 2,108,174 | Mays | Feb. 15, 1938 |
| 2,141,030 | Clark | Dec. 20, 1938 |
| 2,155,322 | McCullough | Apr. 18, 1939 |
| 2,222,405 | Cox et al. | Nov. 19, 1940 |
| 2,672,200 | Patterson | Mar. 16, 1954 |
| 2,780,595 | Fermi | Feb. 5, 1957 |
| 2,782,158 | Wheeler | Feb. 19, 1957 |
| 2,863,815 | Moore et al. | Dec. 9, 1958 |
| 2,885,335 | Moore et al. | May 5, 1959 |

OTHER REFERENCES

International Conf. on Peaceful Uses of Atomic Energy, 1955, vol. 3, pp. 322–329, 295–321.

NAA–SR–1833, Jan. 18, 1957, p. 93 (dwg. 4). Available from OTS, Dept. of Comm., Washington 25, D. C.